United States Patent
Ono et al.

(10) Patent No.: US 11,362,753 B2
(45) Date of Patent: Jun. 14, 2022

(54) OPTICAL NODE DEVICE

(71) Applicant: NIPPON TELEGRAPH AND TELEPHONE CORPORATION, Tokyo (JP)

(72) Inventors: Hirotaka Ono, Musashino (JP); Mitsunori Fukutoku, Musashino (JP); Shingo Kawai, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 36 days.

(21) Appl. No.: 16/967,674

(22) PCT Filed: Feb. 1, 2019

(86) PCT No.: PCT/JP2019/003619
§ 371 (c)(1),
(2) Date: Aug. 5, 2020

(87) PCT Pub. No.: WO2019/155990
PCT Pub. Date: Aug. 15, 2019

(65) Prior Publication Data
US 2021/0159996 A1   May 27, 2021

(30) Foreign Application Priority Data
Feb. 7, 2018   (JP) .............................. JP2018-020546

(51) Int. Cl.
*H04J 14/00* (2006.01)
*H04J 14/02* (2006.01)
(Continued)

(52) U.S. Cl.
CPC ........ *H04J 14/02* (2013.01); *H01S 3/094069* (2013.01); *H04B 10/27* (2013.01); *H04B 10/291* (2013.01)

(58) Field of Classification Search
CPC ........ H04J 14/02; H04J 14/04; H04J 14/0212; H04J 14/0217; H04J 14/0284;
(Continued)

(56) References Cited

U.S. PATENT DOCUMENTS 10,965,375 B2 * 3/2021 Ono ..................... H04B 10/294

FOREIGN PATENT DOCUMENTS

JP        2006303877 A  * 11/2006  ............... G02B 5/18

OTHER PUBLICATIONS

K. Fukutoku et al. "Optical Node and Switch Technology for Flexible and Economical Networks." NTT Technical Journal, vol. 25, No. 11 (2013), pp. 12-15. Machine translation attached.
(Continued)

*Primary Examiner* — Hibret A Woldekidan

(57) ABSTRACT

An optical node device includes one or more input-side wavelength selection switches, a plurality of output-side wavelength selection switches, and an amplification unit. The input-side wavelength selection switches include a plurality of output ports, separate input light in accordance with a wavelength, and output the separated light from the output port corresponding to an output destination of the separated light. The output-side wavelength selection switches include input ports each receiving the light output from each of the one or more input-side wavelength selection switches, multiplex the light received from the input ports, and output the light. The amplification unit amplifies the light output from each of the output ports of the input-side wavelength selection switches and outputs the amplified light to the output-side wavelength selection switch at the output destination corresponding to the output port.

13 Claims, 2 Drawing Sheets

(51) Int. Cl.
*H01S 3/094* (2006.01)
*H04B 10/27* (2013.01)
*H04B 10/291* (2013.01)

(58) Field of Classification Search
CPC .......... H01S 3/094069; H01S 3/06754; H04B 10/27; H04B 10/291; H04B 10/2581; H04B 10/294; H04B 10/2942; H04B 10/25; H04B 10/2912; G02B 6/02042; G02B 6/293; G02B 6/356; G02B 6/3558; G02B 6/2848; G02B 6/2938; H04Q 11/0005; H04Q 2011/0016; H04Q 2011/006
USPC .............. 398/48, 45, 49, 50, 51, 160, 79, 68
See application file for complete search history.

(56) References Cited

OTHER PUBLICATIONS

S. Yamakami et al. "Highly Reliable Large-Scale Optical Cross-Connect Architecture Utilizing MxM Wavelength-Selective Switches." Proc. OFC2017. Mar. 19, 2017.
H. Ono et al. "12-Core Double-Clad Er/Yb-Doped Fiber Amplifier Employing Free-space Coupling Pump/Signal Combiner Module." Proc. ECQ2013. Sep. 22, 2013.

* cited by examiner

OPTICAL NODE DEVICE

CROSS-REFERENCE TO RELATED APPLICATIONS

This application is a 371 U.S. National Phase of International Application No. PCT/JP2019/003619, filed on Feb. 1, 2019, which claims priority to Japanese Application No. 2018-020546, filed on Feb. 7, 2018. The entire disclosures of the above applications are incorporated herein by reference.

TECHNICAL FIELD

The present invention relates to an optical node device.

BACKGROUND ART

With the widespread use of smartphones and tablet PCs (personal computers), the data traffic amount in an optical network has been increasing. Especially, in an optical network system in a long-distance/metro area where the data traffic concentrates, it has become increasingly necessary to flexibly deal with a huge amount of traffic, which expands year by year, and contain the traffic efficiently and economically.

An optical cross-connect technique for an optical node achieves a flexible and economic optical network system by using a dense wavelength division multiplexing (DWDM) technique. The architecture of this optical network system has started with the point-to-point connections that achieved the high capacity through the optical signal wavelength division multiplexing (WDM) and progressed through a single-ring structure using a reconfigurable optical add/drop multiplexer (ROADM) that can add/drop the optical signal as it is, and developed further to a multi-ring structure using a multidegree ROADM (for example, see Non-Patent Literature 1). For the multidegree ROADM that achieves the multi-ring or mesh network, 1×M (1 port×multiple ports) or M×M (multiple ports×multiple ports) wavelength selection switches are used (for example, see Non-Patent Literature 2).

CITATION LIST

Non-Patent Literatures

Non-Patent Literature 1: "Optical node and switch technologies for flexible and economical networks" by Mitsunori Fukutoku and two others, NTT technical review, November 2013, pp. 12-15

Non-Patent Literature 2: "Highly Reliable Large-Scale Optical Cross-Connect Architecture Utilizing M×M Wavelength-Selective Switches" by S. Yamakami and four others, Proc. OFC2017, paper Th3K.5, 2017

Non-Patent Literature 3: "12-Core Double-Clad Er/Yb-Doped Fiber Amplifier Employing Free-space Coupling Pump/Signal Combiner Module" by H. Ono and six others, Proc. ECOC2013, paper We.4.A.4, 2013

SUMMARY OF THE INVENTION

Technical Problem

FIG. 4 is a block diagram illustrating a structure of an optical node device 9 in related art that achieves a multidegree ROADM. The optical node device 9 includes a plurality of wavelength selection switches 91. Here, components that achieve the other functions are omitted. The wavelength selection switches 91 are disposed on an input side and an output side of the optical node device 9. In this drawing, the N wavelength selection switches 91 on the input side are described as wavelength selection switches 91-11 to 91-1N, and the N wavelength selection switches 91 on the output side are described as wavelength selection switches 91-21 to 91-2N. By connecting the N wavelength selection switches 91-11 to 91-1N on the input side and the N wavelength selection switches 91-21 to 91-2N on the output side in a mesh shape, the wavelength setting can be performed as desired in selecting the route from the multiple paths.

Here, as the number of paths increases, the number of input/output ports of the wavelength selection switches 91 increases. Thus, the scale of the wavelength selection switches 91 increases and the transmission loss increases.

As the transmission loss of the wavelength selection switches 91 increases, the signal to noise ratio (SNR) deteriorates due to the decrease in signal optical power to transmit, and thus the transmission distance (or the number of spans) decreases.

In view of the above circumstance, an object of the present invention is to provide an optical node device that can suppress the decrease in transmission distance.

Means for Solving the Problem

One aspect of the present invention is an optical node device including: one or more input-side wavelength selection switches that include a plurality of output ports, separate input light in accordance with a wavelength, and output the separated light from the output port corresponding to an output destination of the separated light; a plurality of output-side wavelength selection switches that include input ports each receiving the light output from each of the one or more input-side wavelength selection switches, multiplex the light received from the input ports, and output the light; and an amplification unit that amplifies the light output from each of the output ports of the input-side wavelength selection switches and outputs the amplified light to the output-side wavelength selection switch at the output destination corresponding to the output port.

Another aspect of the present invention is the aforementioned optical node device, in which the amplification unit includes a cladding pumped multicore optical amplifier for each of the input-side wavelength selection switches, and the cladding pumped multicore optical amplifier amplifies the light output from the output port of the corresponding input-side wavelength selection switch, and outputs the amplified light to the output-side wavelength selection switch at the output destination corresponding to the output port.

Another aspect of the present invention is the aforementioned optical node device, in which the amplification unit is an optical amplifier including cores more than or equal to a total value of the number of output ports of each of the input-side wavelength selection switches.

Effects of the Invention

According to the present invention, the decrease in transmission distance in the optical node device can be suppressed.

DESCRIPTION OF EMBODIMENT

One embodiment of the present invention is described in detail with reference to drawings.

Figure 1:
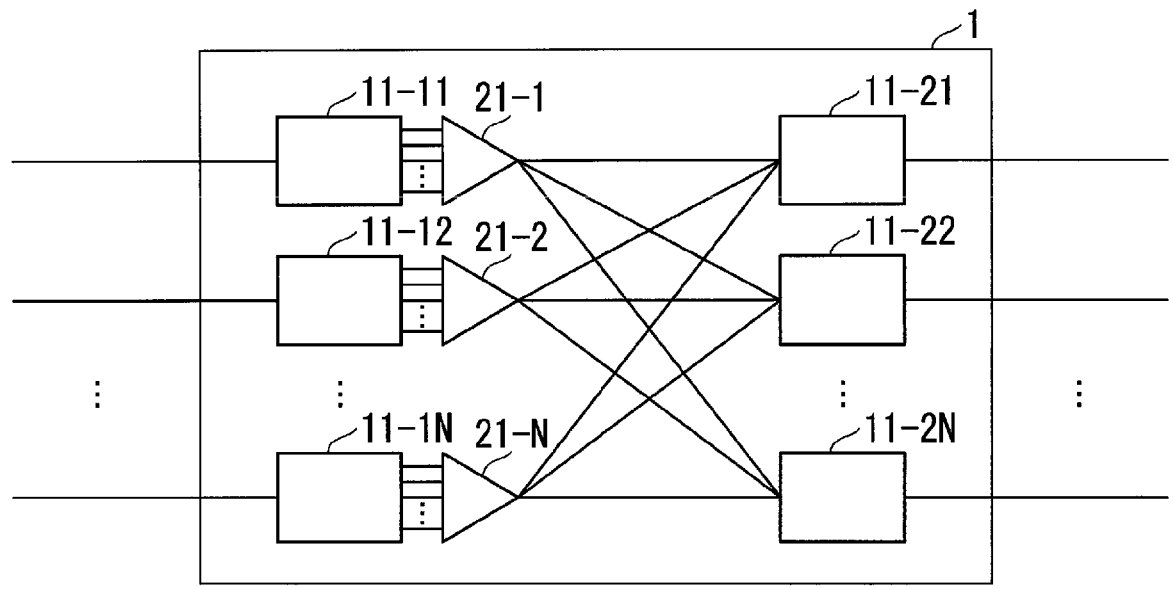
FIG. 1 is a block diagram illustrating a structure of an optical node device according to one embodiment of the present invention.

FIG. 1 is a block diagram illustrating a structure of an optical node device 1 according to one embodiment of the present invention.

In this drawing, the optical node device 1 includes 2N wavelength selection switches 11 and N cladding pumped multicore optical amplifiers 21 (N is an integer of 2 or more). In this drawing, the N wavelength selection switches 11 on the input side are described as wavelength selection switches 11-11 to 11-1N, and the N wavelength selection switches 11 on the output side are described as wavelength selection switches 11-21 to 11-2N. Moreover, the cladding pumped multicore optical amplifier 21 receiving the light output from the wavelength selection switch 11-1*n* (n is an integer of 1 or more and N or less) is described as a cladding pumped multicore optical amplifier 21-*n*. In the example described below, N is 9.

Figure 4:
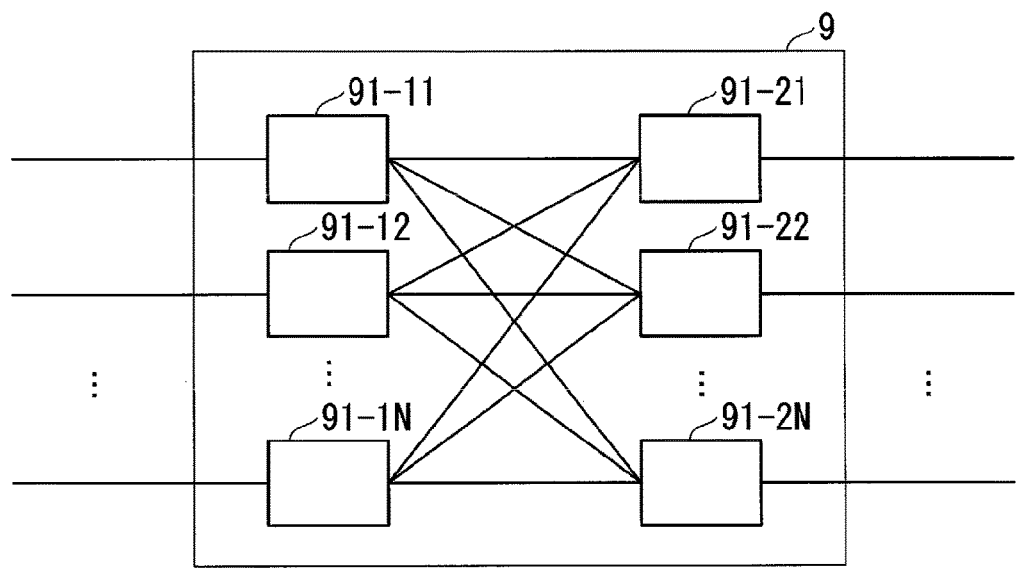
FIG. 4 is a block diagram illustrating the optical node device in related art.

The wavelength selection switch 11 includes 1×9 ports. The total insertion loss of the wavelength selection switches 11 on the input side and the wavelength selection switches 11 on the output side including the connection loss is 33 dB. The wavelength selection switches 11-11 to 11-1N separate the light input from one port on the input side for each wavelength. The wavelength selection switches 11-11 to 11-1N output the separated light from a port on the output side according to the output destination of the separated light (wavelength) among the nine ports on the output side (output ports). The ports of the wavelength selection switches 11-11 to 11-1N on the output side correspond to the wavelength selection switches 11-21 to 11-2N, respectively. The nine ports of the wavelength selection switches 11-21 to 11-2N on the input side (input ports) receive the light output from the wavelength selection switches 11-11 to 11-1N, respectively. The wavelength selection switches 11-21 to 11-2N multiplex the light received from the nine ports on the input side, respectively and output the light from one port on the output side. The wavelength selection switch 11 may be the wavelength selection switch 91 illustrated in FIG. 4.

The cladding pumped multicore optical amplifier 21 includes a double-clad nine-core erbium doped fiber and a multimode 980-nm semiconductor laser (LD). In the signal optical ports of the cladding pumped multicore optical amplifier 21, an optical fiber on the side of the amplifying multicore fiber is a double-clad nine-core fiber and an optical fiber on the other port is a single-clad nine-core fiber, and an optical fiber on the excitation light source side is a single-clad multimode. The cladding pumped multicore optical amplifier 21 includes a multiplexer/demultiplexer with functions of coupling the corresponding cores in both multicore fibers in a lens optical system and multiplexing the excitation light and the signal light with a dichroic mirror into the multicore fiber. As one example, the cladding pumped multicore optical amplifier 21 has a structure described in Non-Patent Literature 3.

The nine signal optical ports of the cladding pumped multicore optical amplifier 21-*n* on the input side receive the light from the nine ports of the wavelength selection switches 11-1*n* on the input side. Moreover, the nine signal optical ports of the cladding pumped multicore optical amplifier 21-*n* on the output side output the light to the wavelength selection switches 11-21 to 11-2N on the output side. The cladding pumped multicore optical amplifier 21-*n* outputs the amplified light to the wavelength selection switches 11-21 to 11-2N corresponding to the ports to which the wavelength selection switches 11-1*n* output light. For example, the cladding pumped multicore optical amplifier 21-*n* amplifies the light received from the i-th port (i is an integer of 1 or more and 9 or less) of the wavelength selection switch 11-1*n*, and outputs the light to the wavelength selection switch 11-2*i*. The cladding pumped multicore optical amplifier 21 includes a gain of about 10 db and compensates for a part of the insertion loss of the wavelength selection switch 11 in the optical node device 1. Thus, the drastic decrease of the signal optical power in the optical node device 1 can be prevented.

Figure 2:
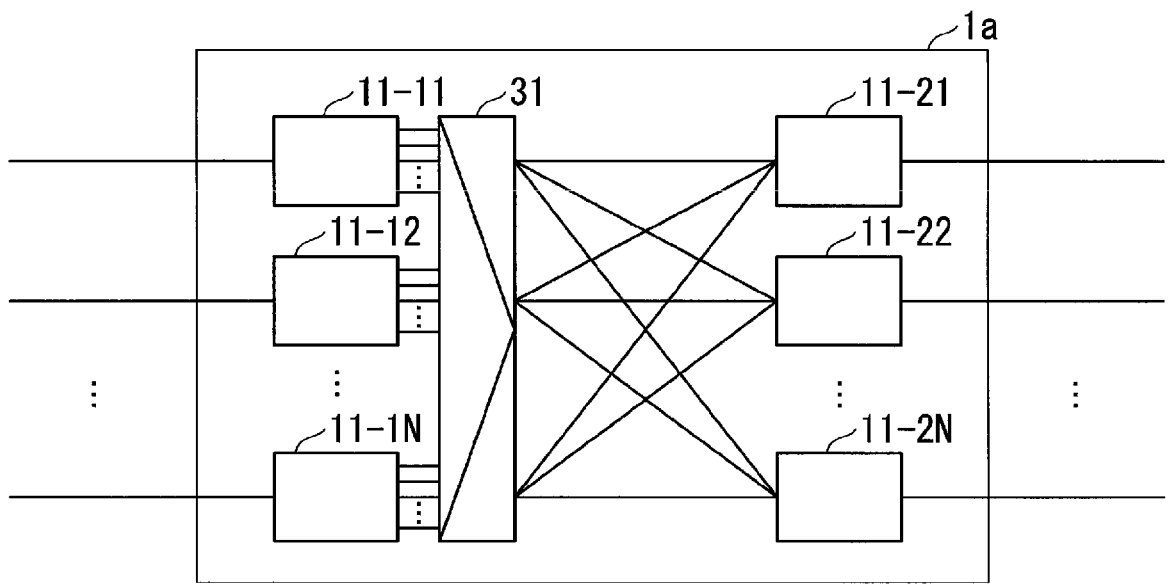
FIG. 2 is a block diagram illustrating another structure of the optical node device according to the embodiment.

FIG. 2 is a block diagram illustrating a structure of an optical node device 1*a* according to the present embodiment. In this drawing, the same part as that in the optical node device 1 illustrated in FIG. 1 is denoted by the same reference sign and the description thereof is omitted.

The optical node device 1*a* includes an optical amplifier 31 instead of the cladding pumped multicore optical amplifiers 21-1 to 21-N in the optical node device 1. Instead of the N cladding pumped multicore optical amplifiers 21, the following structure can be employed: one optical amplifier 31 including cores more than or equal to the total value of the number of ports (1×M, M is a positive integer) of each of the wavelength selection switches 11-11 to 11-1N is provided on each of the input side and the output side. The optical amplifier 31 outputs the amplified light to any of the wavelength selection switches 11-21 to 11-2N according to the port to which the wavelength selection switch 11-1*n* has output the light. For example, the optical amplifier 31 amplifies the light input from the i-th port (i is an integer of 1 or more and N or less) of the wavelength selection switch 11-1*n*, and outputs the light to the wavelength selection switch 11-2*i*.

Figure 3:
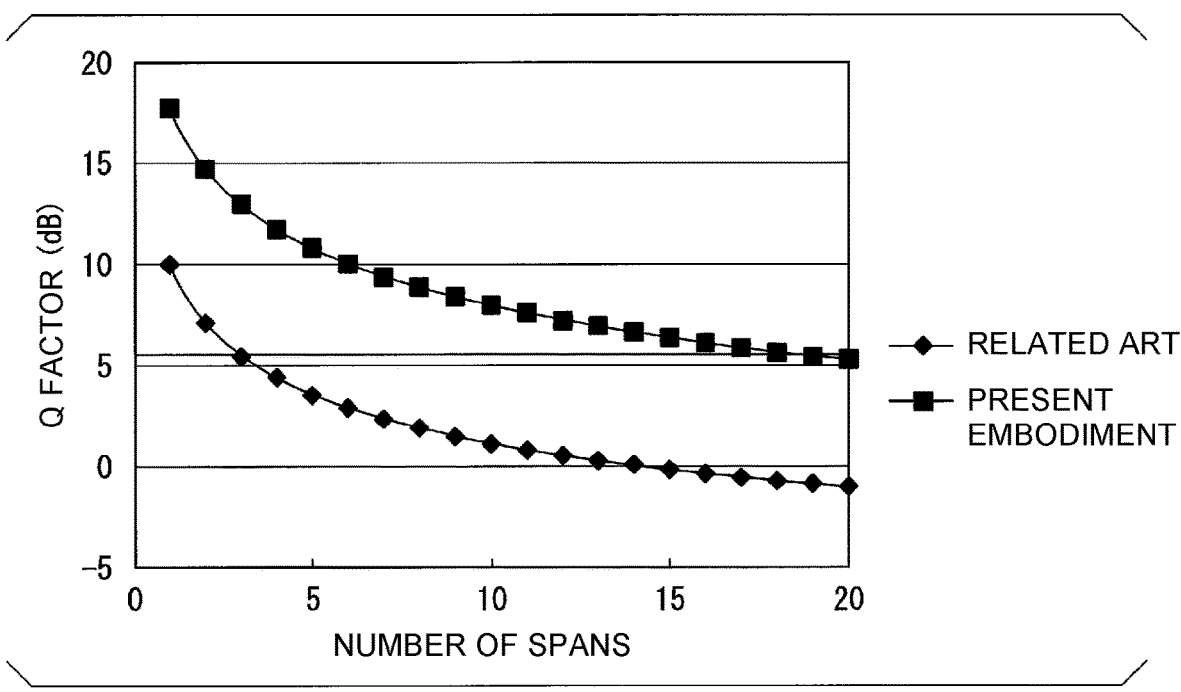
FIG. 3 is a diagram illustrating a transmission characteristic of the optical node device according to the embodiment and an optical node device in related art.

FIG. 3 is a diagram illustrating a transmission characteristic of the optical node device 1 according to the present embodiment and the optical node device 9 in related art. The graph in FIG. 3 expresses the comparison of dependence of the Q factor on the number of spans. The graph shows the transmission characteristic of each of the optical transmission system using the optical node device 1 according to the present embodiment and the optical transmission system using the optical node device 9 in related art. As the Q factor has a larger value, the light can be accumulated longer. The optical transmission system transmits a 36-Gbaud (Giga baud) polarization division multiplexing 16-QAM (Quadrature Amplitude Modulation) signal. The optical amplifiers (not shown) disposed on the input side of the optical node devices 1 and 9 have an input power of −26 dBm and a gain of 20 dB. The optical amplifiers (not shown) disposed on the output side of the optical node devices 1 and 9 have an output power of −10 dBm and a gain of 19 dB in the case of the optical node device 1 according to the present embodiment and 29 dB in the case of the optical node device 9 in related art. The loss of the transmission fiber (including other parts and connection loss) is 16 dB. The transmissions signal has an overhead of 20%, and is encoded by the algorithm using a low-density parity test code, and the error is corrected in a receiver. The reception Q factor limit here is 5.7 dB.

As illustrated in this drawing, in the optical node device 9 in related art, since the Q factor is lower than 5.7 dB after the transmission of three spans, the number of spans capable of transmission is two at most. On the other hand, in the optical node device 1 according to the present embodiment, the Q factor is over 5.7 dB until 18 spans, and it is suggested that the number of spans capable of transmission can be increased to 18, which is nine times larger than that of the optical node device 9 in related art.

Note that the aforementioned embodiment describes the case in which the number of input-side wavelength selection switches 11 and the number of output-side wavelength selection switches 11 are the same; however, these numbers may be different from each other. If the numbers are different, the number of input-side wavelength selection switches 11 may be one.

In the aforementioned embodiment, the optical node device includes the input-side wavelength selection switches and the output-side wavelength selection switches, and the input-side wavelength selection switches and the output-side wavelength selection switches are connected in the mesh shape. The input-side wavelength selection switches are, for example, the wavelength selection switches 11-11 to 11-1N, and the output-side wavelength selection switches are, for example, the wavelength selection switches 11-21 to 11-2N. The optical node device includes the amplification unit between the input-side wavelength selection switch and the output-side wavelength selection switch. The amplification unit amplifies the light that the input-side wavelength selection switch has separated for each wavelength. The amplification unit is, for example, the cladding pumped multicore optical amplifier 21 or the optical amplifier 31.

This structure provides the effect that the optical node device according to the present embodiment can compensate for the transmission loss of the wavelength selection switch that is caused as the number of input/output ports increases, and the decrease in transmission distance (or the number of spans) can be suppressed.

The embodiment of the present invention has been described so far; however, the specific structure is not limited to this embodiment and other designs and the like that do not depart from the concept of the present invention are also included.

REFERENCE SIGNS LIST 1, 1a Optical node device
11-11 to 11-1N, 11-21 to 11-2N Wavelength selection switch
21-1 to 21-N Cladding pumped multicore optical amplifier
31 Optical amplifier

The invention claimed is:

1. An optical node device comprising:
one or more input-side wavelength selection switches that include a plurality of output ports, separate input light in accordance with a wavelength, and output the separated light from the output port corresponding to an output destination of the separated light;
a plurality of output-side wavelength selection switches that include input ports each receiving the light output from each of the one or more input-side wavelength selection switches, multiplex the light received from the input ports, and output the light; and
an amplification unit that amplifies the light output from each of the output ports of the input-side wavelength selection switches and outputs the amplified light to the output-side wavelength selection switch at the output destination corresponding to the output port, wherein
the amplification unit includes a cladding pumped multicore optical amplifier for each of the input-side wavelength selection switches, and
the cladding pumped multicore optical amplifier amplifies the light output from the output port of the corresponding input-side wavelength selection switch, and outputs the amplified light to the output-side wavelength selection switch at the output destination corresponding to the output port.

2. The optical node device of claim 1 wherein:
the one or more input-side wavelength selection switches include 9 input-side wavelength selection switches; and
the plurality of output-side wavelength selection switches include 9 output-side wavelength selection switches.

3. The optical node device of claim 1 wherein each of the one or more input-side wavelength selection switches includes 9 ports.

4. The optical node device of claim 1 wherein the cladding pumped multicore optical amplifier includes a double-clad nine-core doped fiber.

5. The optical node device of claim 4 wherein the cladding pumped multicore optical amplifier further includes a multimode 980 nanometer (nm) semiconductor laser.

6. The optical node device of claim 1 wherein signal optical ports of the cladding pumped multicore optical amplifier include a double-clad nine-core fiber.

7. The optical node device of claim 1 wherein the cladding pumped multicore optical amplifier includes a multiplexer/demultiplexer configured to couple corresponding cores in multicore fibers in a lens optical system and to multiplex excitation light and signal light.

8. The optical node device of claim 7 wherein the multiplexer/demultiplexer is configured to multiplex the excitation light and the signal light using a dichroic motor.

9. The optical node device of claim 1 wherein the cladding pumped multicore optical amplifier includes a gain of approximately 10 decibels.

10. The optical node device of claim 1 wherein a first total number of the one or more input-side wavelength selection switches is the same as a second total number of the plurality of output-side wavelength selection switches.

11. The optical node device of claim 1 wherein a first total number of the one or more input-side wavelength selection switches is different than a second total number of the plurality of output-side wavelength selection switches.

12. The optical node device of claim 1 wherein the one or more input-side wavelength selection switches and the plurality of output-side wavelength selection switches are connected in a mesh shape.

13. An optical node device comprising:
one or more input-side wavelength selection switches that include a plurality of output ports, separate input light in accordance with a wavelength, and output the separated light from the output port corresponding to an output destination of the separated light;
a plurality of output-side wavelength selection switches that include input ports each receiving the light output from each of the one or more input-side wavelength selection switches, multiplex the light received from the input ports, and output the light; and
an amplification unit that amplifies the light output from each of the output ports of the input-side wavelength selection switches and outputs the amplified light to the output-side wavelength selection switch at the output destination corresponding to the output port, wherein the amplification unit is an optical amplifier including cores more than or equal to a total value of a number of output ports of each of the input-side wavelength selection switches.

* * * * *